United States Patent [19]
Chaplin

[11] 3,884,018
[45] May 20, 1975

[54] HARVESTING MARINE GROWTHS AND PACKAGING THE TREATED PRODUCT

[76] Inventor: Merle P. Chaplin, 609 Driver Ave., Winter Park, Fla. 32789

[22] Filed: Jan. 8, 1973

[21] Appl. No.: 321,704

Related U.S. Application Data
[63] Continuation-in-part of Ser. No. 119,555, March 1, 1971, abandoned.

[52] U.S. Cl. ................................................ 56/9
[51] Int. Cl. ........................................... A01d 45/08
[58] Field of Search ..................... 83/402, 98, 100; 37/54–59; 56/8, 9, 32, 126–130

[56] References Cited
UNITED STATES PATENTS

| | | | |
|---|---|---|---|
| 634,864 | 10/1899 | Bates | 37/58 |
| 727,807 | 5/1903 | King | 56/8 |
| 1,571,395 | 2/1926 | Clark | 56/9 |
| 1,705,428 | 3/1929 | Twiford | 37/66 |
| 1,764,202 | 6/1930 | Dreyfus | 83/402 X |
| 2,217,766 | 10/1940 | Neff | 83/402 |
| 2,320,283 | 5/1943 | Knowlton et al. | 56/9 |
| 2,450,082 | 9/1948 | Crumb et al. | 56/343 |
| 2,629,218 | 2/1953 | Smith | 56/9 |
| 2,725,702 | 12/1965 | Ross | 56/501 |
| 3,512,280 | 5/1970 | DiPenna | 37/57 |
| 3,546,858 | 12/1970 | Chaplin | 56/9 |
| 3,626,675 | 12/1971 | Chaplin | 56/9 |

FOREIGN PATENTS OR APPLICATIONS
768,990  5/1934  France ................................... 56/9

*Primary Examiner*—Russell R. Kinsey
*Attorney, Agent, or Firm*—Edwin E. Greigg

[57] ABSTRACT

Apparatus for removing marine growths from a body of water such that the growths are removed from the water by suction, and immediately cut into short lengths. Thereafter, the water accompanying the cut growths is separated and the growths are compressed, removing additional amounts of water. Then the cut growths are sterilized and partially dried, fortifying and/or other materials are added, and the product so treated is baled for shipment, with the entire procedure being accomplished automatically.

19 Claims, 21 Drawing Figures

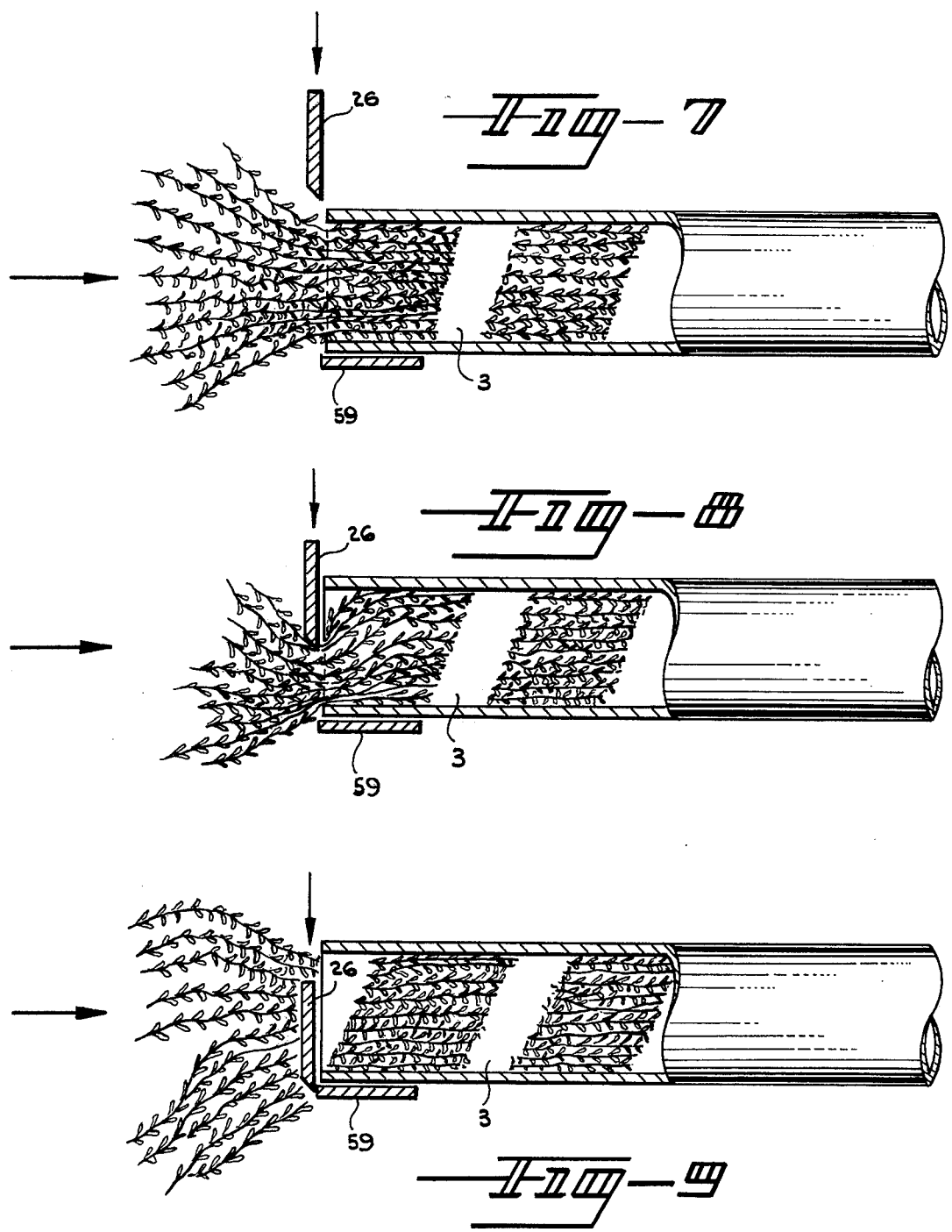

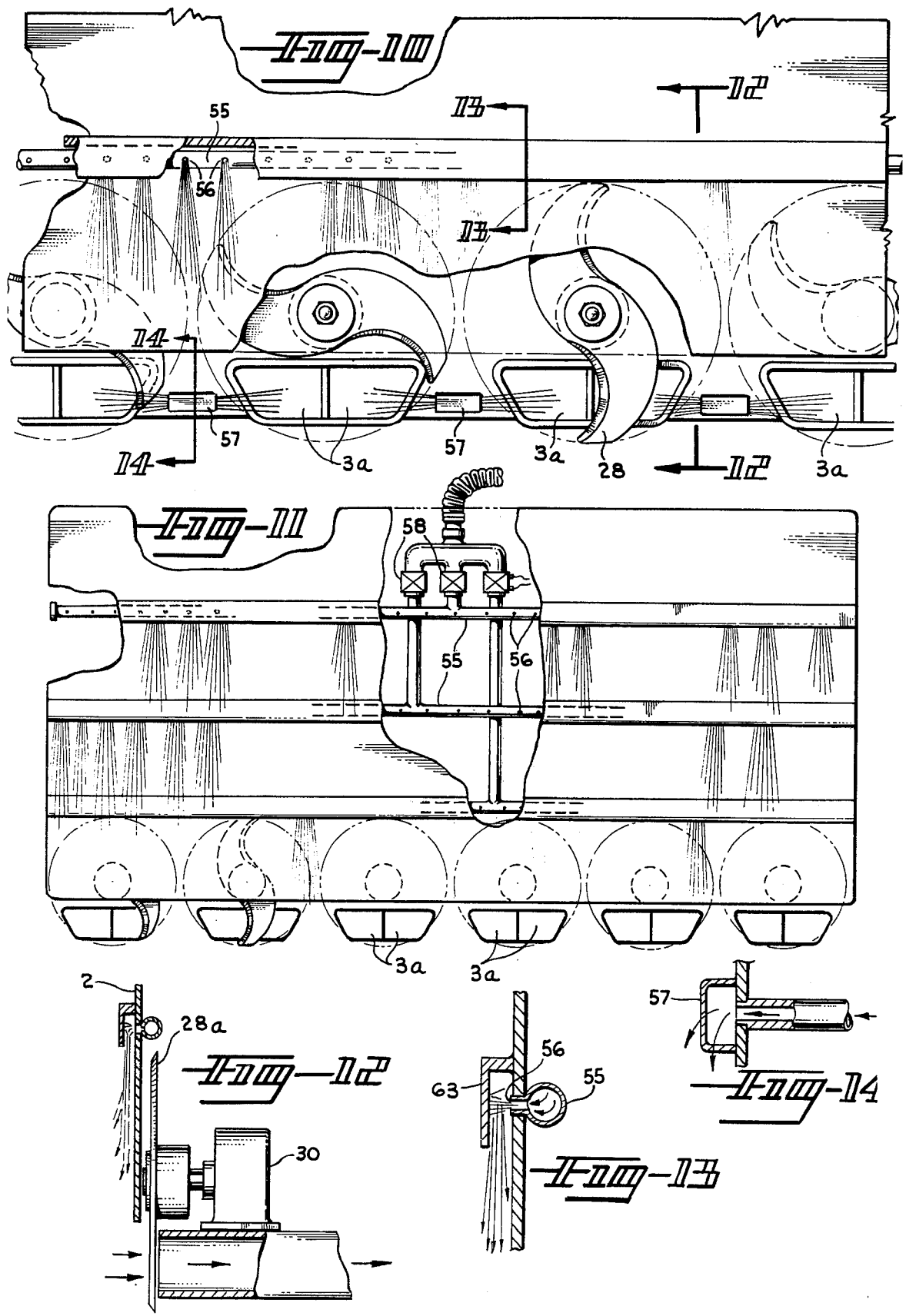

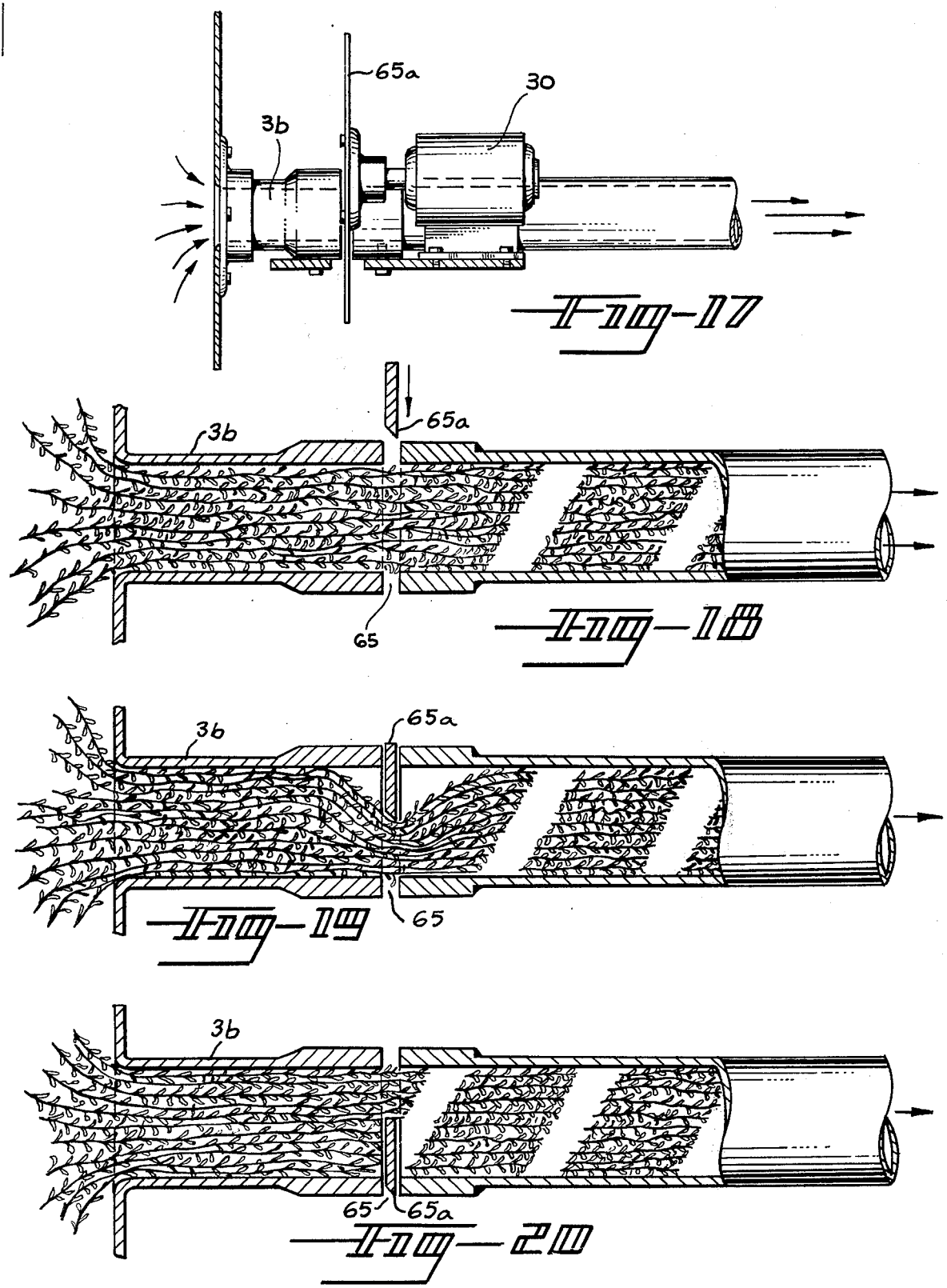

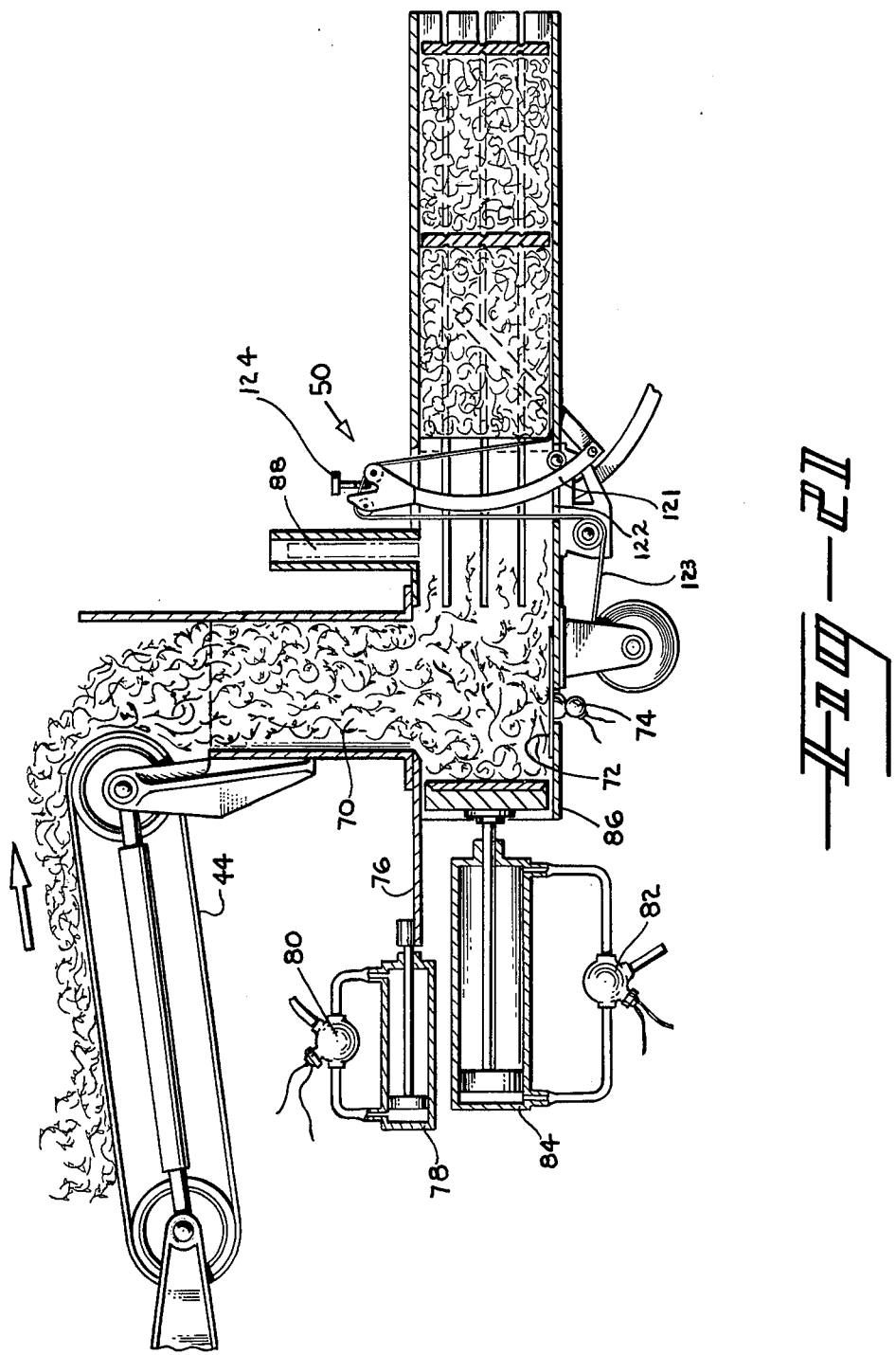

HARVESTING MARINE GROWTHS AND PACKAGING THE TREATED PRODUCT

This is a Continuation-in-Part of my application "Preparing Marine Growths for Packaging," Ser. No. 119,555, filed Mar. 1, 1971, now abandoned.

RELATED INVENTIONS

In my U.S. Pat. No. 3,546,858 there is disclosed apparatus for removing whole marine growths from a body of water by suction, after which the water drawn in with the whole growths is separated therefrom, the whole growths are shredded, and then they are extruded to form blocks or bricketts.

In my U.S. Pat. No. 3,626,675 there is disclosed apparatus for separating water from the growths. There is also disclosed apparatus for random cutting of the growths well removed from the suction opening of the device which separates the water from the growths. To start the equipment in operation, the trap door near the top of that device must be closed to enable suction to build up and draw the growths into the bottom of the central tube. As soon as the growths reached the top of the device, the trap door must be opened.

It will be noted in FIGS. 1 and 2 of the above patent, that the device is located horizontally, and designed for use in connection with my above mentioned U.S. Pat. No. 3,546,858.

In FIG. 4 of U.S. Pat. No. 3,626,675, the tubular device is located in an inclined position with random cutters operating in advance of the inlet to the device, these designed to break up the entangled whole growths, and urge them towards the suction inlet.

SUMMARY OF THE INVENTION

It is the purpose of the invention herein disclosed to provide a full automatic hydro-mechanical device for removing marine growths from a body of water, and deliver these growths in bale form properly prepared as a food product, or for other purposes or disposal.

The tubular device of U.S. Pat. No. 3,626,675 is employed, but is herein mounted vertically with its lower end constantly immersed in the body of water from which the growths are to be removed, thereby eliminating the necessity of the trap door of the above patent.

Horizontal tubes connected to the lower end of the tubular structure of U.S. Pat. No. 3,626,675 terminate in either one of the two types of growth cutters herein disclosed, each designed to cut the growths into short lengths.

In addition to the two water removal features of U.S. Pat. No. 3,626,675, there has been added herein a sterilizing and drying section.

After being cut into short lengths, the water removed, and the cut growths sterilized, they may have added to them fortifying, preservative or other materials. The cut and twisted growths are then baled by any convenient or useful device, not a part of this invention.

This has been found to be a decided improvement over the apparatus disclosed in my U.S. Pat. No. 3,546,858, as the cut growths are much more easily transported thru pipes, and also they have much less bulk then the tangled whole length growths.

GENERAL OBJECTIVES

One primary object of this invention is to provide apparatus for cleanly cutting the marine growths into short lengths as they are being drawn into the horizontal tube by suction. FIGS. 7, 8 and 9.

Another primary object of this invention is to provide apparatus for cleanly cutting the marine growths into short sections as they are being drawn through a horizontal tube by suction. FIGS. 18, 19 and 20.

Another object is to add a third feature to U.S. Pat. No. 3,626,675, namely a sterilizing and drying section above the two water extraction sections shown in the tubular structure of that patent. FIG. 4.

Another object is to provide for adding fortifying, preservative or other materials to the cut growths after they have had the water extracted and have been sterilized. FIG. 2.

Another object of this invention is to provide means for moving the entire tubular structure of U.S. Pat. No. 3,626,675 up or down while maintaining it in vertical position which carries with it the horizontal tubes and the growth cutters, thereby enabling the marine growths to be harvested at different depths.

An overall object is to provide a completely integrated full automatic apparatus, including various auxiliary equipment mounted on a floating structure capable of being moved in any direction on the surface of a body of water, whereby marine growths can be removed from the body of water at any desired depth within the limits of the apparatus, the marine growths cut into short lengths, processed and delivered in bale form.

Another feature is to provide recessed areas in the bottom of the floating structure in which the propellors of the several propulsion units operate, to permit the equipment to operate in shallow water.

Reference is made to the following drawings:

FIG. 1 is a plan view of the equipment mounted on a floating structure or barge;

FIG. 2 is a side elevation with a portion of the barge structure in section, showing the tubular structure of U.S. Pat. No. 3,626,675 mounted vertically, with horizontal tubes connected at the bottom, terminating in a growth cutting mechanism;

FIG. 3 is a front view of the apparatus, with the tubular structure of U.S. Pat. No. 3,626,675 in the center, and the cutting mechanism attached to its lower end. This view also shows the apparatus for moving the cutters and associated mechanism up and down;

FIG. 4 is a sectional view of the tubular structure of my U.S. Pat. No. 3,626,675, showing in accordance with this invention, the added feature at the top for sterilizing and partially drying the cut marine growths;

FIGS. 7 – 8 – 9 are somewhat enlarged sectional view of the horizontal tubes, and the stationary and moving cutters operating to cut the growths into short lengths as they are drawn to the tube by suction, and removed by suction after being cut;

FIGS. 10 through 14 are views of hydraulic nozzle arrangements designed to urge the marine growths towards the suction area;

FIGS. 15 through 20 represent an alternate arrangement for cutting the growths into short lengths whereby the growths are drawn into horizontal tubes by suction, and are cut into short lengths by cutters passing periodically through a slot in the tube; and FIG. 21 is a conventional type of bale press of U.S. Pat. No. 2,450,082, which is one of many types which may be employed.

DETAILED DESCRIPTION

Figure 1:
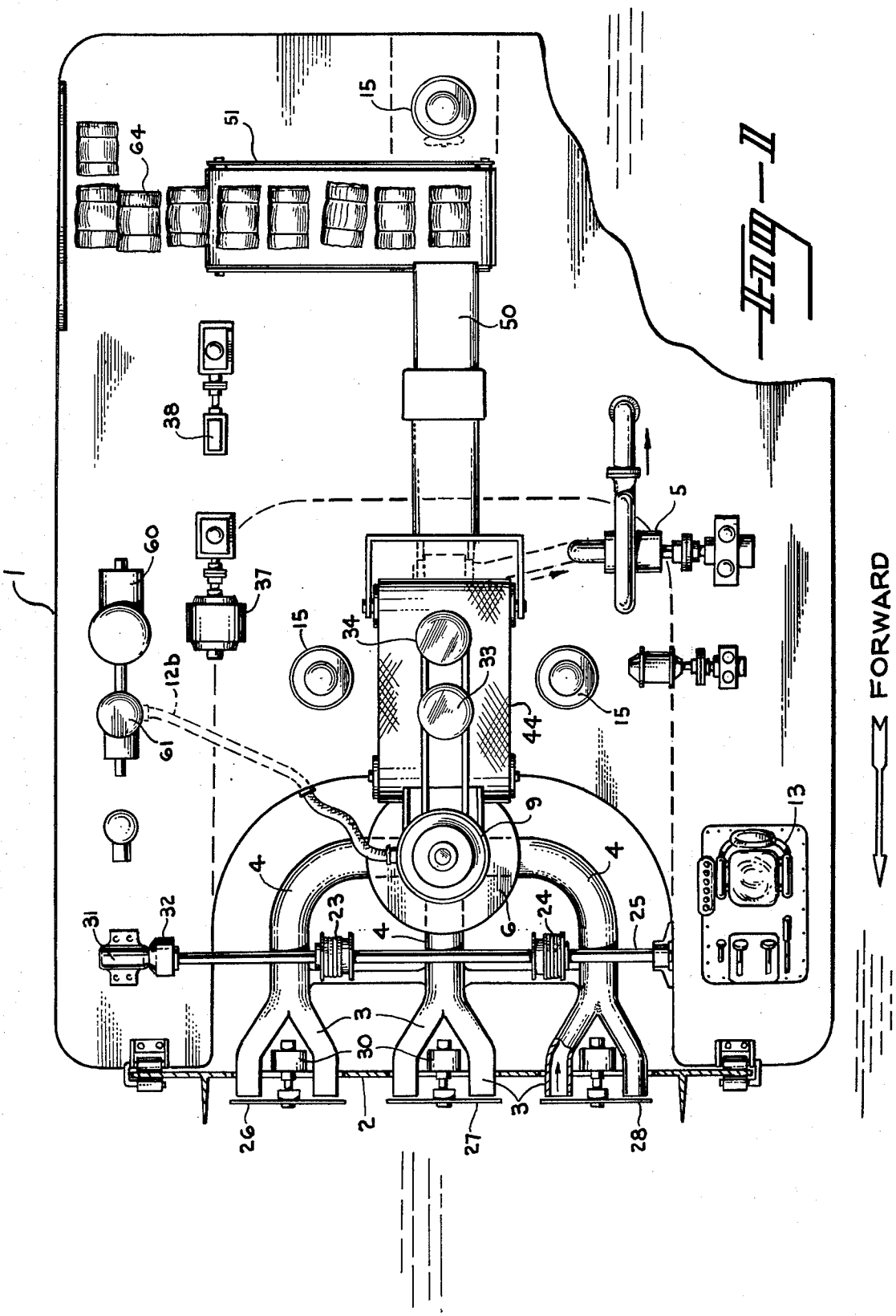
Figure 2:
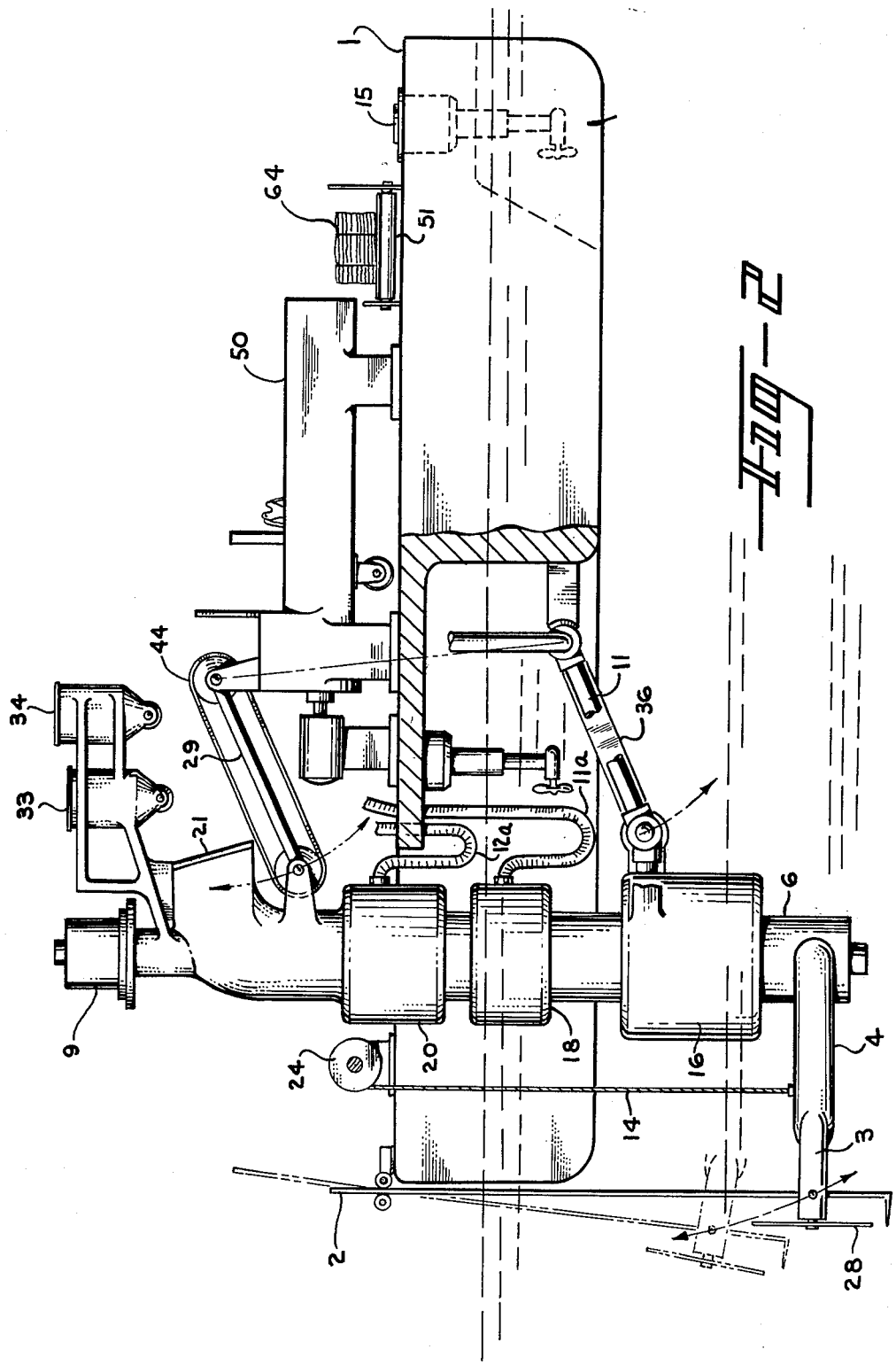
Figure 3:
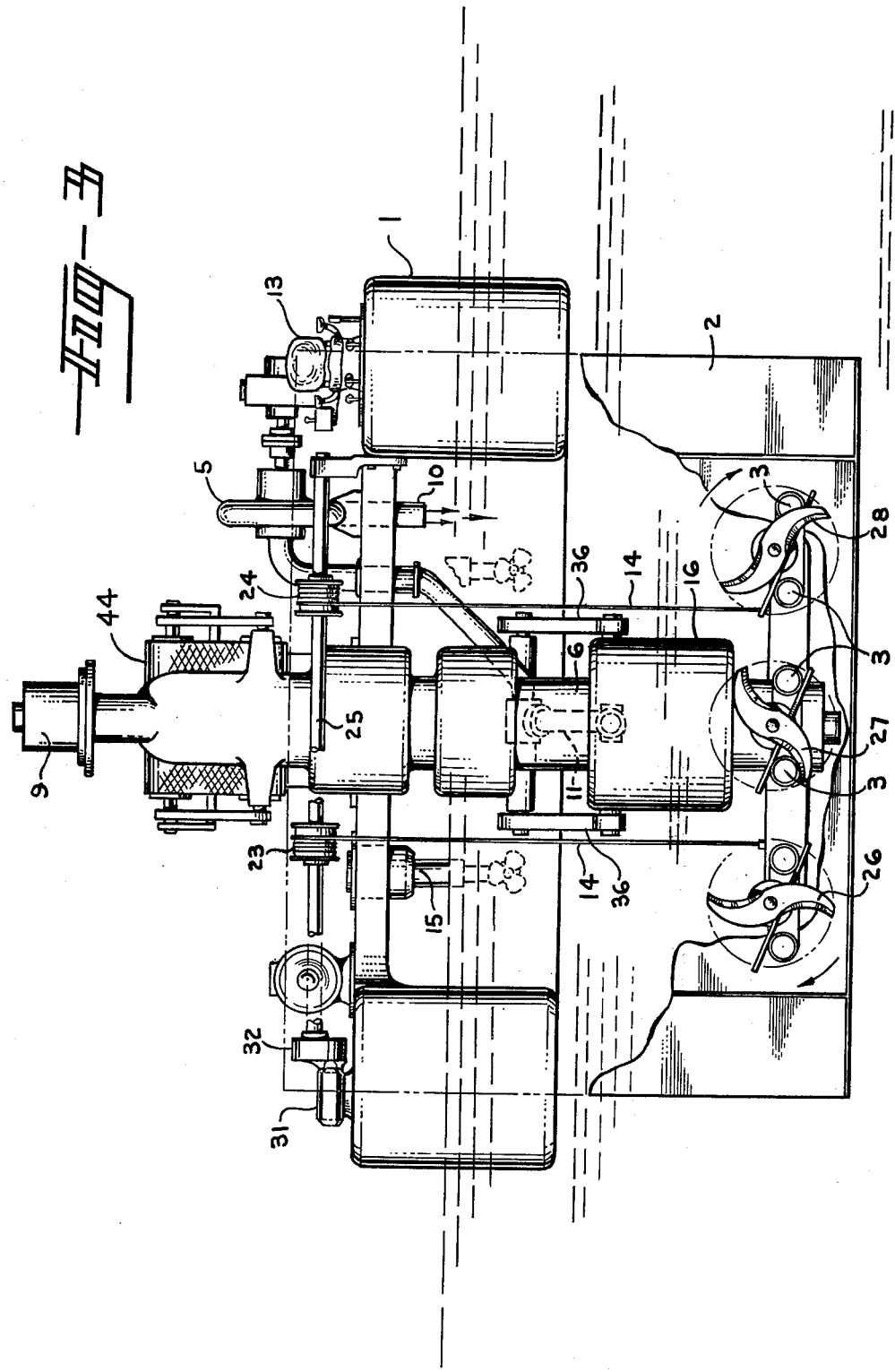

In FIGS. 1, 2 and 3, there is shown the general arrangement of the fully automatic hydro-mechanical harvester for marine growths in accordance with this invention, with these views revealing a considerable amount of the equipment that functions to enable my device to effectively and non-randomly harvest marine growths, treat them with heat and chemicals as necessary or appropriate, and then compress the growths into a form that can be conveniently transported.

The barge or float 1 is steered and operated from a position or seat 13 that is oriented in such a way as to allow the operator to maneuver the craft so that it can harvest growths and weeds in a selective manner, even at very shallow depths. A plurality of propulsion units 15 are utilized in accordance with this invention, which units are preferably electrically powered and individually rotatable about a full 360°, thus to enable the operator through suitable controls to bring about a very precise steering of a craft in a desired direction. The propellers of these units are located in recessed areas on the underside of the self-propelled floating device 1, not only permitting the equipment to operate in shallow water, but also protecting the propellers from damage from underwater obstructions. Electric generator means 37, preferably driven by a gasoline engine, supplies power for the propulsion units 15, as well as for other motors, such as of a belt conveyor, and also for navigation lights.

An elongate tubular structure of the type shown at 6 and at 106 in my U.S. Pat. Nos. 3,626,675 and 3,707,070 is shown at 6 in instant FIGS. 1 through 4, and I hereby incorporate by reference all of the relevant teachings of those patents herein. However, the elongate tubular structure 6 of the present invention differs by the inclusion of an additional upper section, and by the fact that it is maintained in a substantially vertical position for selective up and down movement by means of a swinging link 36 pivotally attached to its lower end, which is adjacent suction pipe 11 operatively connected to the main water removal chamber 16, and by a swinging link 29 pivotally attached at the upper end of the tubular structure 6, adjacent the conveyor 44.

The up and down movement of the elongate tubular structure 6 is accomplished by cables 14 operated by cable drums 23 and 24, which are operated by a fluid motor 31 through a high ratio reduction unit 32 which maintains the drums in a fixed position after being rotated by the fluid motor to a desired position.

Figure 4:
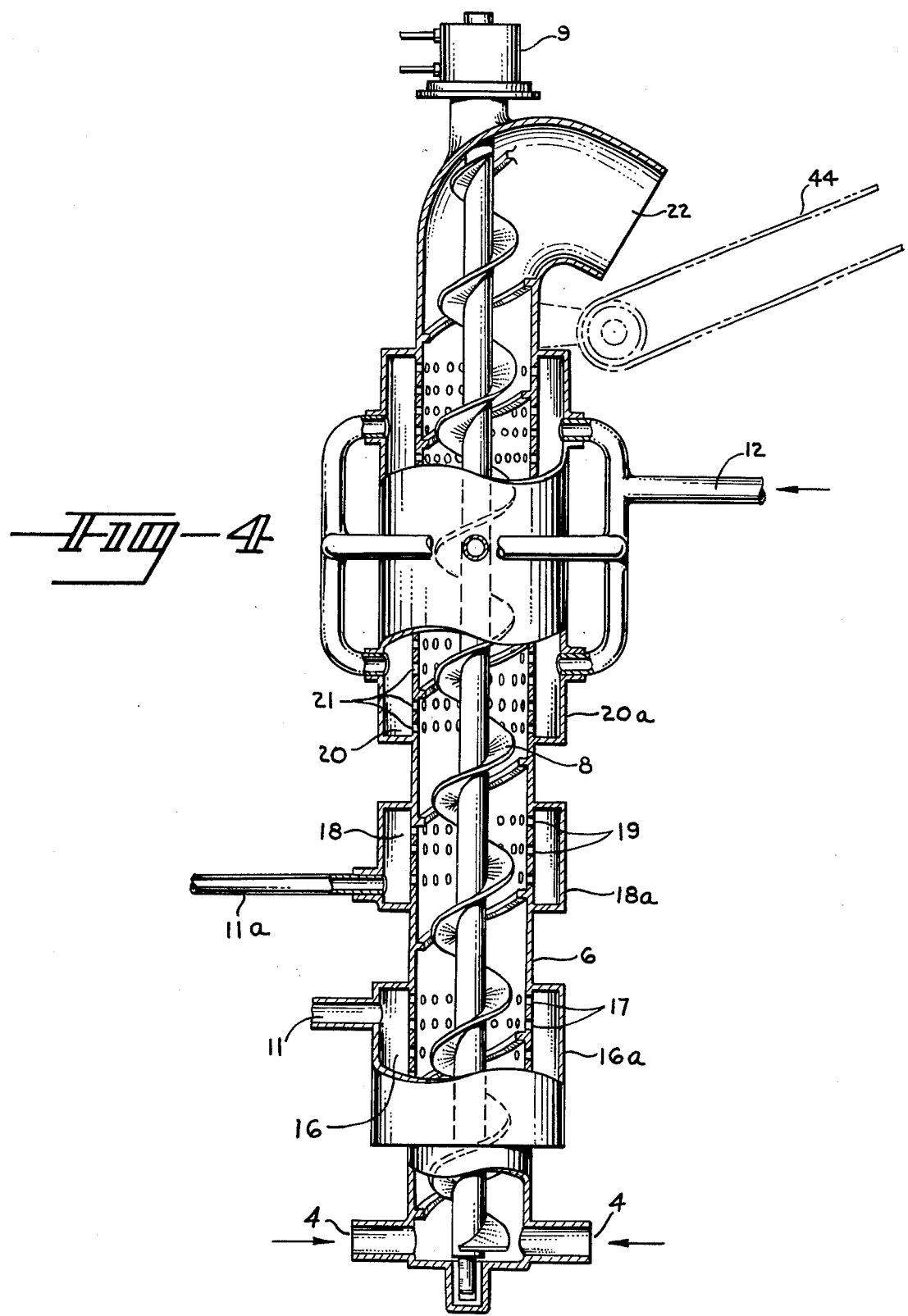
Figure 5:
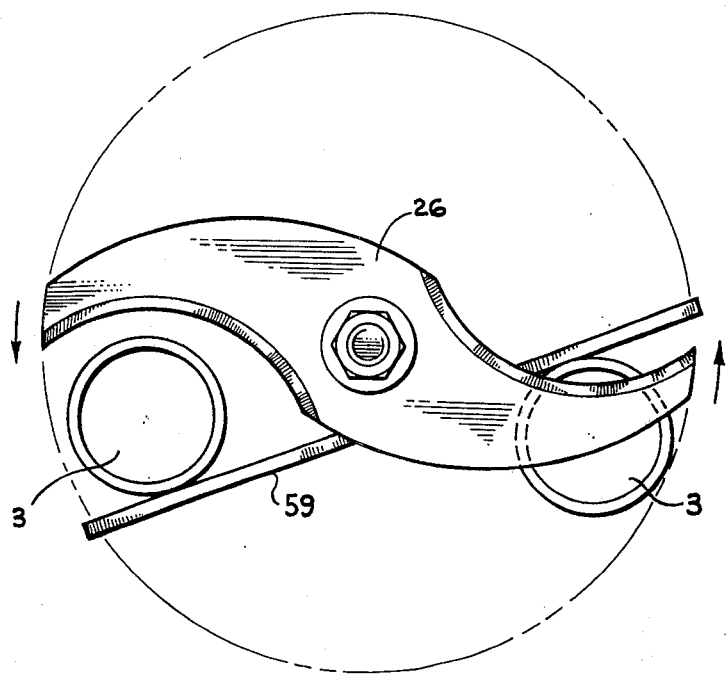
FIGS. 5 – 6 are front views of intake nozzle and cutter arrangements, illustrating two possible multiple arrangements of intake nozzles.
Figure 6:
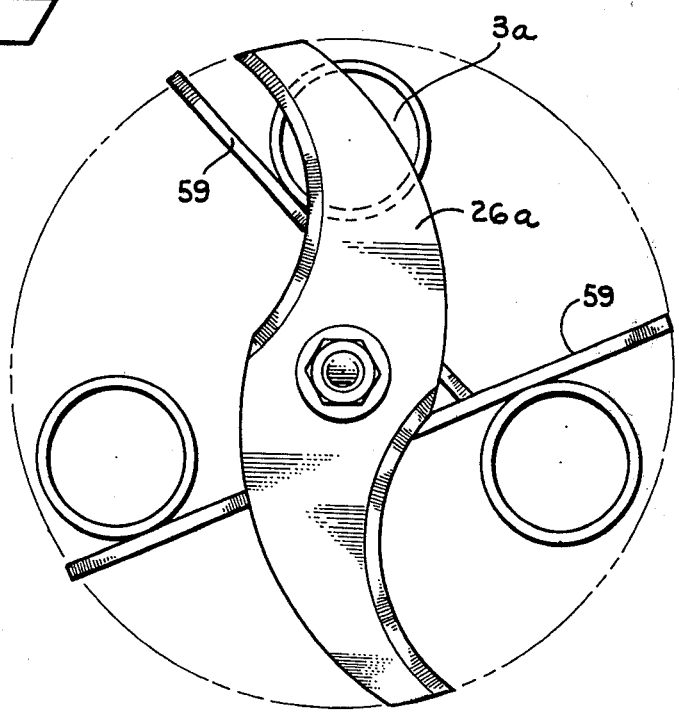
Figure 15:
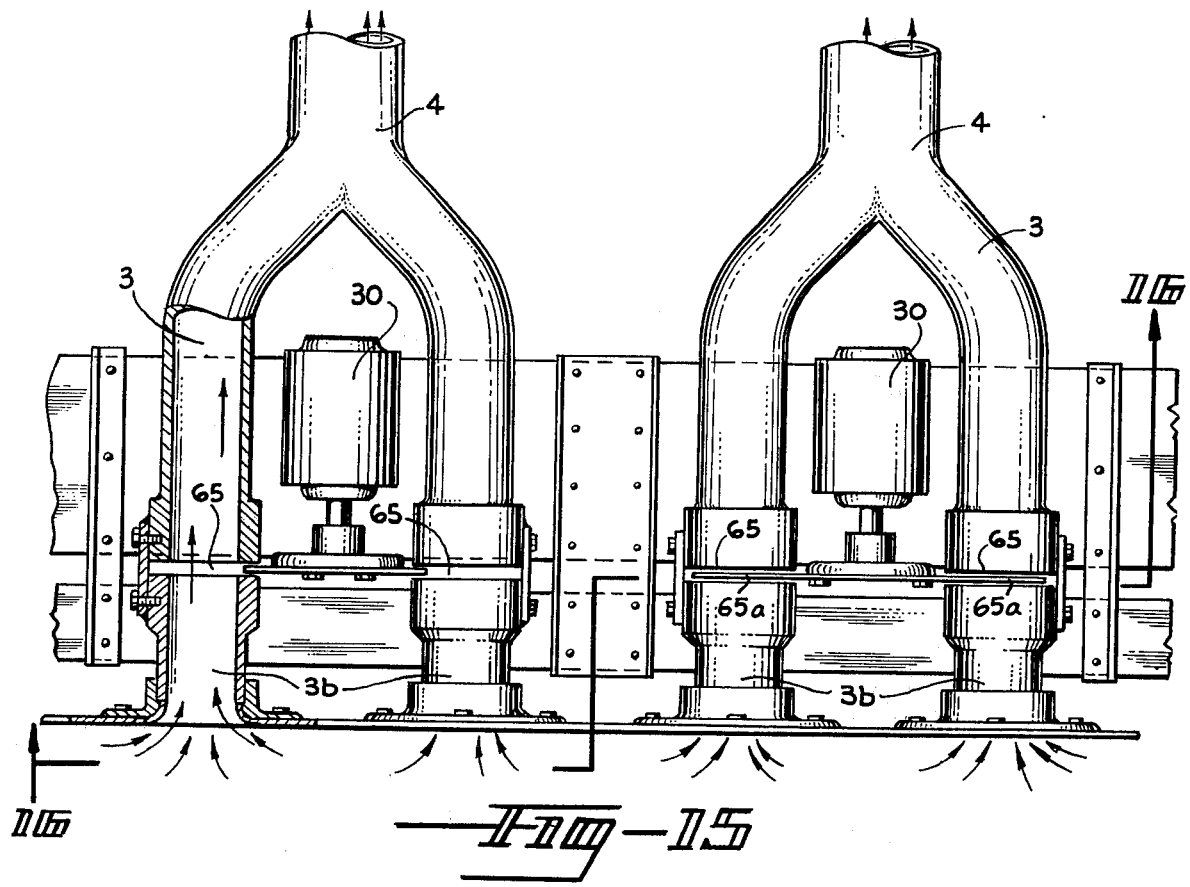
Figure 16:
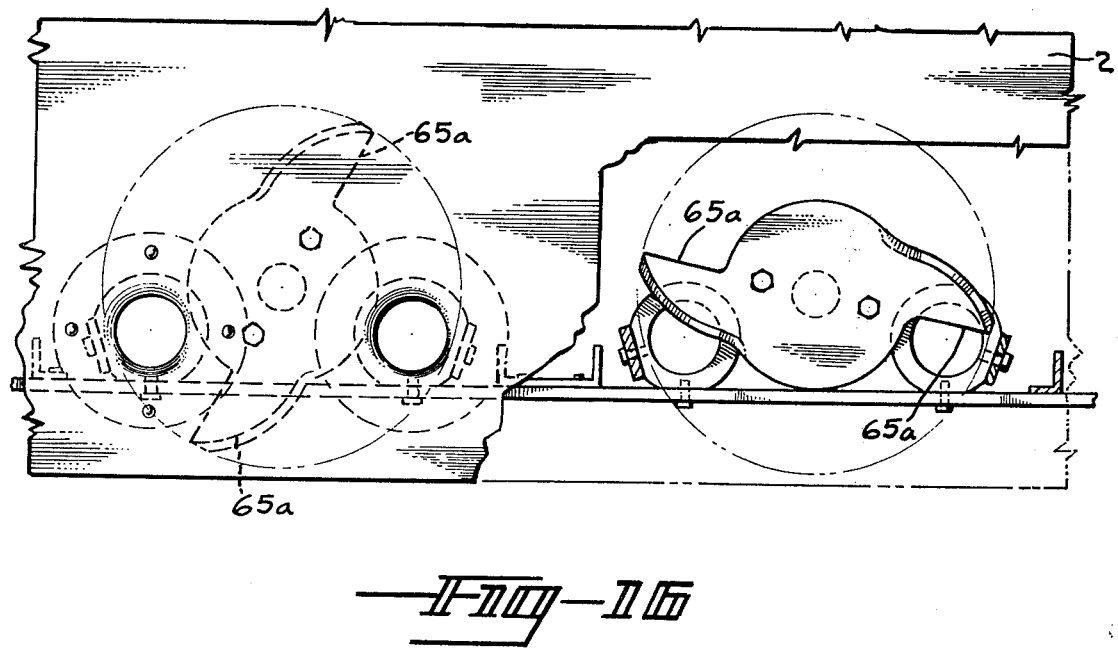

Operatively connected to the lower end of the vertically disposed elongate structure 6 are suction pipes 4, visible in FIGS. 1, 2 and 4, which lead forwardly to a plurality of generally horizontally disposed tubular members 3. These tubular members are each equipped with inlets, such that by the application of suction, encountered growths are caused to enter these tubular members and pass therealong into the elongate structure 6. Growth cutting devices are disposed at or near the forward ends of the tubular members 3, such that the growths may be cut uniformly and nonrandomly into short lengths, and two different types of cutting means in accordance with this invention will be described in some detail hereinafter. To direct the growths to the several areas of suction, a plate 2 is affixed at its lower end to the tubes 3, and guided at its upper end by guide rolls whereby the plate moves up and down with the growth cutters and associated mechansim when the hydraulic motor 31 is turned on by the operator.

Referring to FIGS. 10 through 14, a plurality of pressure water jets shown in section at 56 in FIG. 13, urge the growths towards the suction and cutting areas, which in this showing are six in number, with two suction and cutting openings in each. Pressure water is supplied through control valves 58 to pipes 55, which supply water to jets directed across the plate surface either vertically as shown in FIGS. 10, 12 and 13, or horizontally from spray nozzles as shown at the bottom of FIG. 10.

Referring again to FIGS. 1, 2 and 3, the main suction pipe 11 is provided at each end with a swinging joint, with the suction pipe extending up through the deck of the barge to the main suction pump 5, the discharge of which is back into the lake or other body of water. This pump also supplies suction to chamber 18 of the elongate structure 6 through suction hose 11a.

Mounted adjacent to the main suction pump 5 is a vacuum pump used to remove air extracted from the growths by assisting in the suction operation of pump 5 in removing air at the suction inlet in a way well known in the art. Also mounted on the deck of the barge on the opposite side to the main suction pump is the previously mentioned electric generator 37 primarily utilized for operating the multi-directional propulsion units 15, and also for supplying current for lights and other uses.

Mounted on the barge deck near the electric generator is a fluid oil pressure pump 38, for operating the hydraulic motors utilized to drive the cutter blades, the lift cables, fluid oil controls, and other uses. Mounted near the electric generator is a steam boiler 60, and a steam superheater 61 connected to the upper chamber 20 of the device 6 taught in my U.S. Pat. No. 3,626,675 as will be described later. Also mounted near the steam superheater is a superheater for air.

Recourse may be had to my U.S. Pat. Nos. 3,626,675 and 3,707,070 for the details of construction and operation of the elongate tubular structure 6, and suffice it to say here that chamber 16, somewhat larger than the diameter of the basic portion of the structure 6, is defined by cylindrical member 16a, with a number of perforations 17 being disposed in the sidewall of the tubular structure at locations inside the chamber, so that water contained in the entering plants and weeds can be drawn off through pipe 11; see appended FIG. 4. The perforations 17 are disposed about the entire periphery of the tubular structure at the location of the chamber 16, so that the reduced pressure existing in this chamber will cause water to leave the plants and weeds in substantially all directions, drawn therefrom by pump 5, and thence be returned back to the lake or other body of water through the pipeline 10. Thus, the weeds do not pass through the pump itself.

It will be noted that a helical element or screw conveyor 8 is rotatably disposed in the vertically disposed elongate structure 6, being driven in rotation by a hydraulic motor 9. As will be understood, the weeds caused to reach the screw conveyor 8 as a result of the reduced pressure provided by the pump 5 will by operation of conveyor 8 be caused to move upwardly in structure 6.

A second chamber 18 may be disposed about the tubular structure adjacent the first chamber, being defined by a cylindrical member 18a disposed in surrounding relationship about a midportion of the tubular structure, with perforations 19 disposed in the sidewall inside chamber 18 so that more water may be removed at this location.

As the cut growths continue their upward movement through the central tube 6, they come opposite the central tube openings 21 inside of the chamber 20a. Heated air or preferably superheated steam is supplied through pipe 12 to several positions through the outer wall of chamber 20a so that the air or steam is forced into and through the cut growths during their entire passage by the chamber 20a whereby they become thoroughly sterilized and partially dried; note particularly FIG. 4.

Continued upward movement of the cut growths by the spiral conveyor 8 discharges them through opening 22 onto conveyor 44. Located above the conveyor 44 are automatic devices for discharging fortifying, preservative or other materials, these being delivered to the cut and sterilized growths as they are carried along by conveyor 44. Any type of feeder may be used the operation of which is well known in the art.

The cut, dewatered, sterilized and fortified growths are then delivered to any suitable type of baling device, such as the one illustrated by U.S. Pat. No.. 2,450,082, a portion of the structure of which is shown by FIG. 21.

Referring to FIGS. 5 through 9, there is shown one useful mechanism for cutting the marine growths into short lengths. One or more horizontal tubular members 3 to which suction is applied, draw the growths to the open tube ends, as shown by the horizontal arrow. Affixed to the tube at its open end is a stationary cutter blade 59, the cutting edge of which is just beyond the open end of the tube 3. A rotary cutter of the general design shown at 26 and 26a in FIGS. 5 and 6, moves rapidly past the end of the tube as indicated in FIG. 8, and cuts the growths by contact with the stationary blade 59, as shown in FIG. 9.

A second type of mechanism for cutting marine growths into short lengths is shown in FIGS. 15 through 20. In this instance, the growths are cut after they enter the horizontal tube 3, by means of a rotary cutter blade 65a passing through a slot 65 in the tube member 3, the growths being drawn through the tube by suction. The rotary cutter 65a may be driven by any suitable device, such as a fluid motor 30. FIGS. 18, 19 and 20 show the progressive movement of the cutter 65a through the slot 65.

The various pumps and other equipment may be driven by any suitable devices, such as an internal combustion engine. The forward movement of the equipment is controlled from the master control station 13 as well as control of speed and direction. Depth control, rotating speed of cutters, speed of spiral conveyor of unit 9 and speed of conveyor 44 are also controlled from this station.

This figure does not attempt to show the operating mechanism of this particular baler, which can be learned by refering to the above patent. In utilizing this particular type of equipment, the link 19 has been replaced by a piston rod, and the gears 21 replaced by a hydraulic cylinder as hydraulic power was available, whereas most bailers are all mechanical. Other makes of balers which may be utilized are illustrated by U.S. Pat. Nos. 2,545,188, 1,850,134, 455,731 and 543,278.

Operating Procedure

With power obtained from the electric generator 37, the three propulsion units 15 serve to move the barge 1 to the area from which marine growths are to be removed.

Arriving at the area from which growths are to be removed, the oil pressure pump 38 is activated and the rotary cutters 26, 27 and 28 started, these being driven by fluid motors 30. It is also desirable to activate the steam generator and superheater so that superheated steam will be available when the growths reach the sterilizing position near the top of the tubular structure of U.S. Pat. No. 3,626,675. Pipe 12b connects the superheater to the upper chamber 20.

The main suction pump 5 can now be activated. It is important that the cutter blades be in operation before the suction pump is started, otherwise the growths will accumulate on the ends of the horizontal suction pipes 3, and the rotary blades will jam. Two other pieces of equipment should be activated, one the conveyor belt 44 which transfers the cut growths to the bale press 50, and the base press itself.

With equipment activated as indicated, the spiral conveyor 8 of FIG. 4 is started, this being driven by any suitable means such as a fluid motor 9. The cutter blades are then positioned at the desired depth at which the growths are to be removed, and the entire apparatus moved by the propulsion units into the area of marine growths.

The rotating cutters 26, 27 and 28 illustrated in FIGS. 1 and 3 will then start cutting the growths into short pieces, which pieces will be drawn by the suction supplied by pump 5 thru pipes 3 and 4 into the bottom of the device of U.S. Pat. No. 3,626,675, which device is shown in section in FIG. 4. This suction supplied by pump 5 exhausts the water from chamber 16, which water is drawn thru openings 17 of the central tube.

The water drawn thru pipe 4 with the cut growths is thus removed from the growths by being drawn thru openings 17 into the chamber 16 and out thru pipe 11, and is returned to the lake or other body of water by pump 5.

The cut growths from which the water has been largely removed are then carried upward by the spiral conveyor 8 operating inside tube 6. As the cut growths continue their upward movement under the urge of conveyor 8, they become compressed, and additional water is removed thru suction pipe 11a and chamber 18, this water being drawn from the growths thru openings 19 in the central tube 6.

As the cut growths continue their upward movement thru the central tube 6, they come opposite the central tube openings 21 inside of the chamber 20. Heated air or preferably superheated steam is supplied thru pipe 12 to several positions thru the outer wall of chamber-defining member 20a so that the air or steam is forced into and thru the cut growths during their entire passage by the chamber 20, whereby they become thoroughly sterilized and partially dried.

Continued upward movement of the cut growths by the spiral conveyor 8 discharged them thru opening 22 onto conveyor 44. Located above the conveyor 44 are automatic devices for discharging fortifying, preservative or other materials these being delivered to the cut and sterilized growths as they are carried along by conveyor 44. Any type of feeders may be used, the operation of which is well known in the art, and for example I may use a dispensing apparatus 33 to sprinkle preservatives on the marine growths, and a dispensing apparatus 34 to dispense fortifying materials, if such be desired.

The cut, dewatered, sterilized and fortified growths are then delivered to any suitable type of baling device, such as the one illustrated by U.S. Pat. No. 2,450,082, a portion of the structure of which is shown herein by FIG. 21.

The bales so prepared are preferably removed from the deck of the barge by lighters for delivery to shore so that the harvesting equipment can be kept in continuous operation.

It will thus be seen that the disclosures of this invention provides full automatic equipment for harvesting marine growths with a minimum of labor, and delivering them in a compact package for shipment and use.

I claim:

1. An apparatus for removing marine growths from a body of water, comprising, in combination: a generally tubular member having at least one inlet and being positionable beneath the surface of a body of water substantially parallel to this surface, means coupled to said tubular member for applying suction thereto to cause encountered marine growths to enter each said inlet, rotatable cutter bar means mounted on a frame means forming part of the apparatus to rotate in a plane substantially at a right angle to the longitudinal axis of said tubular member in close vicinity to each said inlet and serving to cut growths which enter said tubular member into substantially uniform lengths, means coupled to said tubular member for conducting said cut growths to a close-by location for further processing, and means for driving each cutter bar, said means for driving each cutter bar being mounted on said frame means.

2. The apparatus as defined in claim 1, wherein said cutter bar means includes a number of respective rotatable cutter bars, and each said rotatable cutter bar interacts with a respective stationary cutter mounted on said tubular member adjacent each said inlet of said tubular member in cutting the entering growths.

3. The apparatus as defined in claim 1, including a number of respective slots disposed in said tubular member, wherein said cutter bar means including a number of respective rotatable cutter bars, and each said rotatable cutter bar is operative in a respective one of said slots disposed in said tubular member at a location removed from each said inlet, each said cutter bar being of sufficient length to extend across a respective branch of said tubular member and cut the growths passing therealong.

4. The apparatus as defined in claim 1 including means coupled to said tubular member for selectively controlling the depth below the surface of the body of water at which said tubular member is operative.

5. An apparatus for removing marine growths from a body of water comprising, in combination: a plurality of relatively horizontal tubular members each having an inlet and each being positionable beneath the surface of a body of water substantially parallel to this surface at least one cutting device having a rotatable cutting bar mounted on a frame means forming part of the apparatus, in a plane substantially at a right angle to the longitudinal axes of said tubular members in close vicinity to said inlets for cutting growths which enter said tubular members into substantially uniform short lengths, a shield secured to said tubular members adjacent to said cutting device, water jet producing means positioned in the vicinity of said inlets and said cutting device for directing encountered growths toward said cutting device, and means coupled to said tubular members for applying suction thereto.

6. The apparatus as defined in claim 5 in which said cutting device includes a stationary cutter bar.

7. The apparatus as defined in claim 5, including a respective slot disposed in each said tubular member at locations removed from their respective inlets, and wherein each said cutting device includes a respective rotary cutter bar operating in a respective one of said slots, each said cutter bar being of sufficient length to extend across each respective said tubular member and cut the growths passing therealong and each of said cutter bars being rotatable at substantially a right angle to the longitudinal axis of that portion of that tubular member in which it operates.

8. The apparatus as defined in claim 5 in which a single rotary cutter bar is utilized and said tubular members are defined by a pair of tubes, in order to cut entering growths into substantially uniform lengths.

9. A device for harvesting marine growths from a body of water comprising, in combination: a generally horizontally disposed tubular member positionable beneath the surface of a body of water substantially parallel to this surface, a generally vertically disposed tubular structure, to the lower end of which tubular structure said tubular member is operatively attached, said tubular member having an inlet, means for applying suction to said tubular structure, to cause a reduced pressure to exist at said inlet of said tubular member and thus causing encountered marine growths to enter, a cutting means mounted on a frame means forming part of the apparatus and including a rotary cutting bar disposed in operative association with said tubular member in close vicinity to said inlet to rotate in a plane substantially at a right angle to the longitudinal axis of said tubular member, for cutting marine growths which enter said tubular member into substantially uniform lengths.

10. The device as defined in claim 9 including mechanical means for assisting movement of cut growths up through said tubular structure.

11. The device as defined in claim 9 in which said rotary cutter bar is positioned adjacent said inlet of said tubular member.

12. The device as defined in claim 9, including a slot disposed in said tubular member, and in which said rotary cutter bar is positioned in said slot disposed in said tubular member substantially transverse to the length of said tubular member, said rotary cutter bar being of a length sufficient to periodically cut the marine growths being drawn through said tubular member, thus causing the marine growths to be of substantially uniform length.

13. The device as defined in claim 9 in which a second tubular member having an inlet is provided, said second tubular member and the first-mentioned tubular member constituting a pair of spaced, substantially parallel tubular members operatively attached to the lower end of said tubular structure, said rotary cutter bar being operative with respect to both said tubular members, to cut growths entering their respective inlets.

14. The device as defined in claim 13 in which said rotary cutter bar operates at said inlets of said tubular members.

15. The device as defined in claim 13, including respective slots in said tubular members, and in which said rotary cutter bar operates in said slots in said tubular members and is spaced rearwardly from said inlets of said tubular members.

16. The device as defined in claim 9 in which means are provided for controlling the vertical positioning of said tubular structure, thus enabling the depth at which said tubular member is operative to be selectively controlled.

17. The device as defined in claim 9 including means defining at least one chamber disposed about the exterior of said tubular structure, with perforations being utilized such that the interior of said chamber is interconnected with the interior of said tubular structure, whereby suction applied to said chamber will be manifested in said tubular structure as well as in said tubular member.

18. The device as defined in claim 9 including means defining two or more chambers disposed at spaced locations about the exterior of said tubular structure, with each chamber being connected by means of perforations to the interior of said tubular structure, with suction being applied to the lowermost chamber to bring about the removal of water from entering growths, and means for applying heat to the uppermost chamber, thus to assist in the drying of the growths.

19. The device as defined in claim 9 in which said tubular structure is provided with an outlet disposed above the surface of the body of water, and including processing means adjacent said outlet for further processing the marine growths.

* * * * *